(12) United States Patent
Perchlik

(10) Patent No.: US 10,171,633 B2
(45) Date of Patent: Jan. 1, 2019

(54) INTERFACES FOR SELECTING AMONG MULTIPLE COMMUNICATIONS PROTOCOLS

(71) Applicant: Astronics Advanced Electronic Systems Corp., Kirkland, WA (US)

(72) Inventor: David Perchlik, Redmond, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 69 days.

(21) Appl. No.: 15/454,869

(22) Filed: Mar. 9, 2017

(65) Prior Publication Data

US 2018/0262595 A1    Sep. 13, 2018

(51) Int. Cl.
*H04L 12/40* (2006.01)
*H04L 29/06* (2006.01)
*H04B 7/185* (2006.01)

(52) U.S. Cl.
CPC ......... *H04L 69/03* (2013.01); *H04B 7/18502* (2013.01); *H04L 12/40006* (2013.01); *H04L 12/40169* (2013.01); *H04L 2012/4028* (2013.01)

(58) Field of Classification Search
CPC .............. H04L 69/03; H04L 12/40006; H04B 7/18502
See application file for complete search history.

(56) References Cited

U.S. PATENT DOCUMENTS

| 8,112,565 B2 | 2/2012 | Russel, III et al. |
| 2005/0228509 A1* | 10/2005 | James ................. H04L 12/4625 700/19 |
| 2016/0253284 A1* | 9/2016 | Cappaert ............ G06F 13/4282 710/301 |
| 2016/0378971 A1 | 12/2016 | Dunstan |
| 2017/0019365 A1 | 1/2017 | Giansiracusa et al. |

OTHER PUBLICATIONS

Extended European Search Report for EP 18158808..8 dated May 11, 2018.

\* cited by examiner

*Primary Examiner* — Lakeram Jangbahadur
(74) *Attorney, Agent, or Firm* — Wiggin and Dana LLP; Gregory S. Rosenblatt; Jonathan D. Hall

(57) ABSTRACT

Interface circuits are disclosed for manually or automatically selecting among two or more communications protocols in ways that reduce the number of connector pins needed and/or use the same number of connector pins required for a single communications protocol. Such interface circuits are advantageously applicable to selecting and accommodating either RS-485 or 802bw communications protocols in aircraft electronics while enabling space and cost efficient designs.

9 Claims, 7 Drawing Sheets

INTERFACES FOR SELECTING AMONG MULTIPLE COMMUNICATIONS PROTOCOLS

FIELD OF THE DISCLOSURE

The present disclosure generally relates to electronic systems and methods for providing cost and space-efficient interfaces that permit selection from among different communications protocols for use in various applications, including, for example, in electronics systems designed for aircraft environments.

BACKGROUND OF THE DISCLOSURE

Traditionally, aircraft electronics systems provide for and control the power needs of various essential aircraft functions, as well as passenger infotainment systems, automated seat functions, lights, and other equipment that are controlled either by aircraft crew or by passengers. To enable various control functions, such electronic systems generally provide for communications based on a specific communications protocol over an associated bus structure distributed throughout the aircraft that connects various aircraft components. For example, historical, the RS-485 serial communications protocol has been a widely-used communications protocol in many passenger aircraft.

The RS-485 protocol is a low speed communications protocol that operates over a two wire bus (a balanced twisted pair) in a star topology. However, while the RS-485 protocol has found wide-spread use in many narrow body aircraft, its relatively low speed does not permit it to operate effectively over the larger distances found in many wide body aircraft. Such larger aircraft generally have a greater number and wider array of devices that need to electronically communicate across larger distances with each other and with the central electronics in the aircraft. For this purpose, faster protocols have been developed that can still communicate over a twisted pair two wire bus.

In particular, a communications protocol that operates in accordance with the emerging 802.3bw Standard provides a higher speed 100 BASE-T1 Ethernet communications protocol (100 Mb/s) over a single balanced twisted wire pair bus. Its higher speed and ability to operate over the same two wire bus, makes it more desirable for use in certain aircraft (e.g., wide body aircraft) than the older and slower RS-485 protocol.

With the emerging use of the 802.3bw Standard in aircraft, it has become desirous for electronics systems suppliers to the avionic industry to provide a universal electronics box that permits, for example, an aircraft manufacturer to readily select either the RS-485 or 802.3bw communications protocol for use in a particular aircraft, based on determinations made by the aircraft manufacturer and customer.

Significantly, in accordance with this disclosure, a universal electronics box that provides for selection between two communications protocols (e.g., RS-485 or 802bw) is configured in a space and resource efficient design. As disclosed herein, in certain embodiments such universal electronics box does not require any additional connector pins or additional relays, as compared to prior art systems designed for use with only the RS-485 protocol. Since aircraft connectors generally tend to be expensive components and space for additional connectors is limited, providing such selection capability while keeping the same number of pins not only results in cost savings, but also permits additional functionality to be included in the same footprint as prior designs.

Interface configurations are further disclosed herein for electronic systems that permit selection from among multiple communications protocols across multiple ports in a space efficient design that keeps additional connector pins to a minimum.

BRIEF DESCRIPTION OF THE DRAWINGS

The foregoing aspects, and other advantages and benefits of the embodiments and pertinent circuit arrangements disclosed herein for such electronic systems will become more apparent from the following detailed description, which may be understood with reference to the attached drawings, in which like designations refer to like elements, and wherein.

DETAILED DESCRIPTION OF EXEMPLARY EMBODIMENTS

Figure 1:
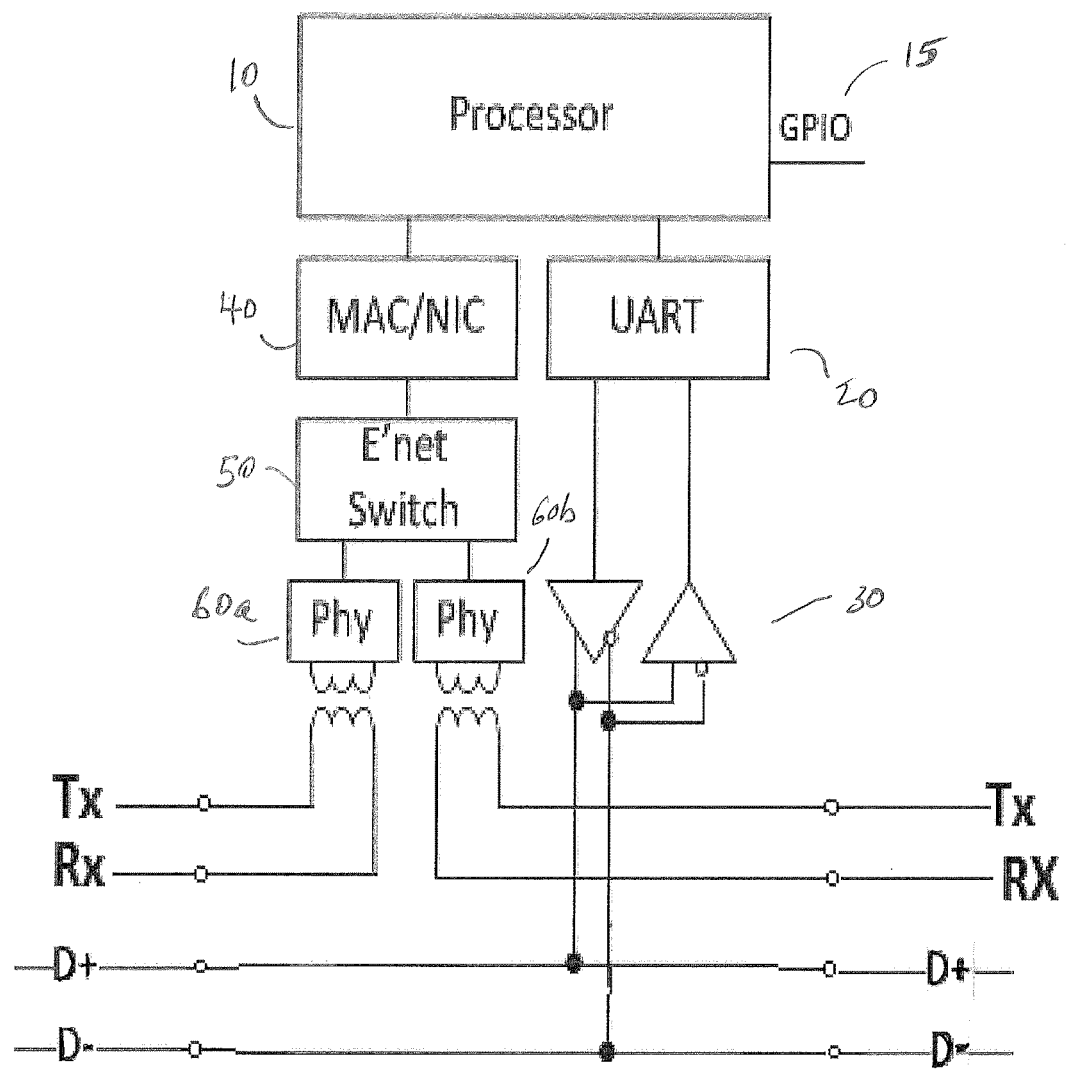
FIG. 1 is a block diagram showing a circuit configuration that may be used to select either an RS-485 or 802bw communications protocol.

The circuit configuration of FIG. 1 shows an arrangement for a controller that may be incorporated into an electronics box, e.g. an avionics electronics box, that permits selection of either an RS-485 or 802bw communications protocol for connection to a two wire bus. Specifically, FIG. 1 shows an arrangement that provides either two 802bw Ethernet ports, each requiring a transmit line Tx and a receive line Rx, or two RS-485 ports, each communicating over D+ and D− lines. As evident from this approach, a total of 8 connector pins are required for this two port system (four for the two port 802bw Ethernet protocol and four for the two port RS-485 protocol.

In FIG. 1, the basic circuitry required to provide these communications protocols includes a processor 10. As shown, processor 10 is provided with a general purpose input/output (GPIO) interface 15. In an aircraft environment, an installer, for example, depending on whether the aircraft is narrow body or wide body, can select use of either the RS-485 protocol or 802bw protocol by providing a logical input signal to the GPIO interface 15, by for example, grounding a particular pin on the GPIO interface 15 to provide a logical signal to the GPIO interface 15.

In operation, processor 10 monitors the logic status of the GPIO interface 15. If processor 10 detects that the RS-485 protocol has been selected, RS-485 signals input thereto are routed from the processor 10 through a Universal Asynchronous Receiver/Transceiver (UART) 20 and a bi directional RS-485 transceiver 30 to the respective sets of D+, D− pins. RS-485 signals input to pins D+, D− are likewise routed along the same path to the processor 10.

In the event that the 802bw protocol is selected by the GPIO interface, the processor 10 is configured to recognize that event and send the corresponding Ethernet signals to a combination media access controller/network interface controller (MAC/NIC) 40 which provides appropriate signals to Ethernet switch 50. The Ethernet switch 50 in turn provides its output signals to respective physical layer circuitry (PHY) 60a and 60b that provide Ethernet signals to the twisted pair Tx and Rx output lines. In FIG. 1, each PHY 60a or 60b is associated with one of two Ethernet ports.

As evident from inspection of FIG. 1, in order to provide a choice of either the RS-485 or 802bw protocol, a total of 8 connector pins are required for this two port configuration (4 connector pins for each port). In the arrangement of FIG. 1, each additional RS-485 port or 802bw Ethernet port would likewise require 4 additional pins. As mentioned above, since aircraft connectors are expensive and space is at a premium, keeping the number of connectors and pins to a minimum is desirable, since it results in significant cost and space savings.

Figure 2:
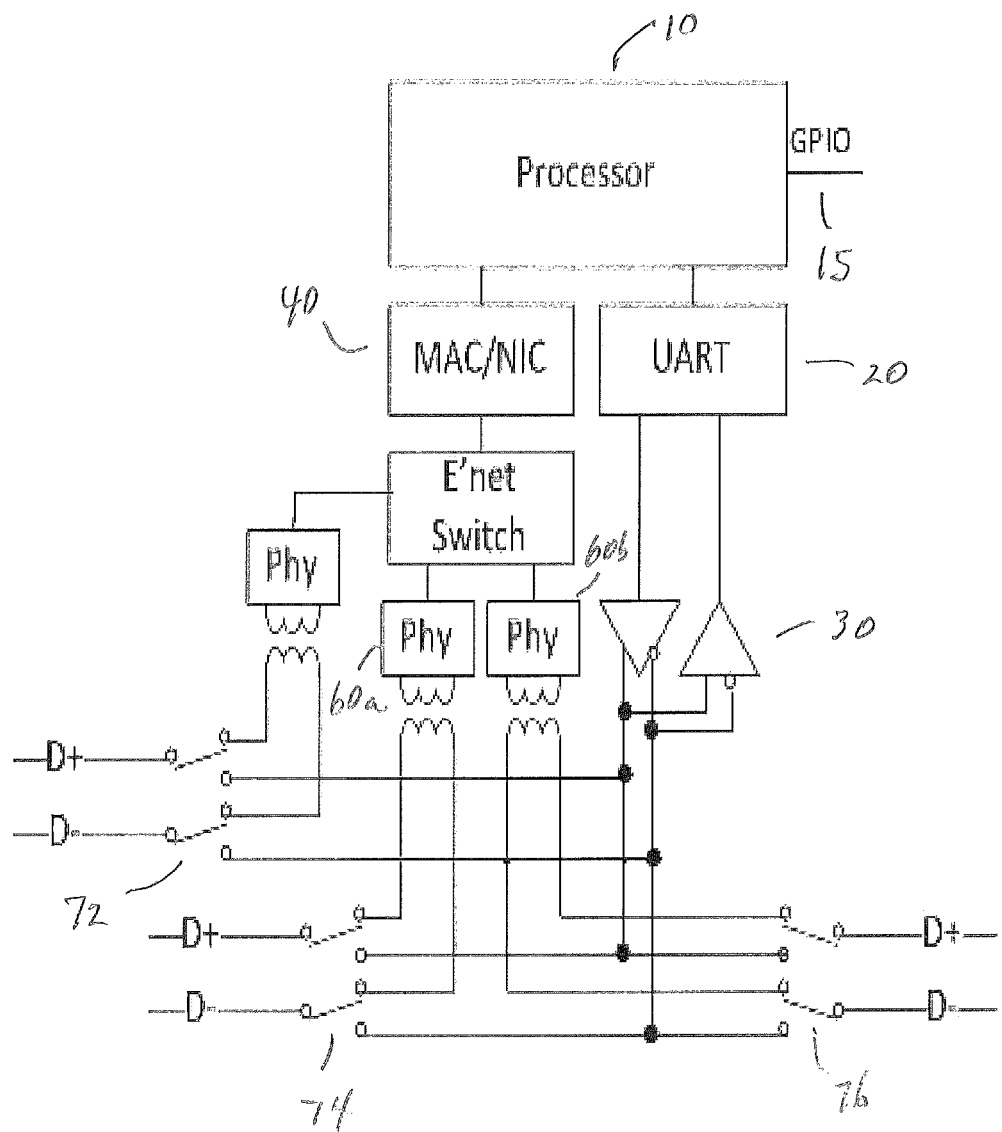
FIG. 2 is a block diagram showing a circuit configuration that may be used to select either an RS-485 or 802bw communications protocol, that includes switches for reducing the number of output pins.

A configuration for reducing the number of connector pins by sharing the connector pins is shown in FIG. 2. However, the FIG. 2 configuration relies on the addition of internal relays 72, 74 and 76 that are controlled by the processor 10, based on the status of the GPIO. Specifically, FIG. 2 shows a 3 port configuration in which the same circuits already shown in FIG. 1 are referenced by like numerals in FIG. 2. Specifically referring to FIG. 2, in this arrangement three double pole internal relays 72, 74 and 76 are controlled by processor 10 to switch signals on three ports to their respective two wire output lines.

Note that a three port configuration arranged in accordance with FIG. 1 would require a total of 12 connector pins, while the FIG. 2 arrangement provides for a 3 port configuration that only requires a total of 6 connector pins. However, while the number of connector pins is reduced in half to 6 (2 for each port), this comes at the expense, both in cost and space, of having to include the three controllable relays 72, 74 and 76. This may be less than desirable for several reasons.

First, stringent 802bw requirements for line impedance limit the relay choice. Second, since relays are prone to mechanical malfunctions, the mean time between failure (MTBF) can be negatively affected. Relays also tend to be relatively large in size and therefore can use up significant "real estate" on a printed circuit board. For these reasons, the use of relays, while possible, is not as desirable as other configurations discussed herein.

As explained further herein, in accordance with the following embodiments, the number of connector pins can be reduced without the use of relays, by having the processor or other circuitry, e.g., in the Ethernet switch, monitor the bus to detect the presence of either Ethernet packets or RS-485 protocol signals, based on their differing characteristics. Depending on which of those packets or signals are detected, the processor or other circuitry can then route the communications signals to their appropriate pathways, as shown in exemplary FIG. 3.

Figure 3:
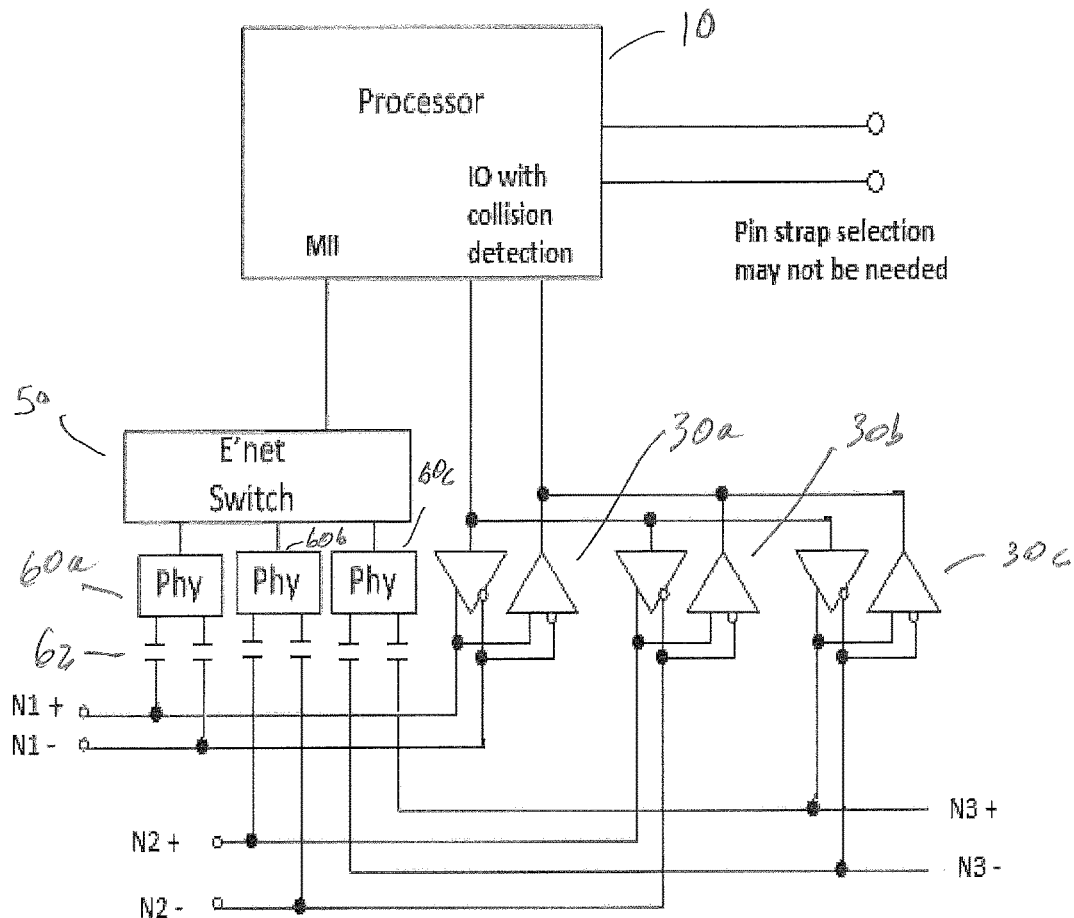
FIG. 3 is a block diagram showing a circuit configuration that may be used to select either an RS-485 or 802bw communications protocol, in a three port configuration that uses six output pins.

In accordance with FIG. 3, which like FIG. 2 shows a 3 port configuration, there is no need for relays. Use of a GPIO interface that provides for pin strap selection of the appropriate protocol may also be dispensed with, if desired. As explained further herein, in the FIG. 3 embodiment, the processor 10 automatically determines the communications protocol being used by measuring the signals it receives, and then routes the communications signals along the appropriate path.

For example, processor 10 may be configured so that, for example, upon turn on, it monitors the communications bus for the occurrence of Ethernet packets whose characteristics comport with the requirements of the 802bw protocol. If the processor 10 does not detect any Ethernet packets, then it converts to RS-485 mode and will route serial communications data it receives to an integral UART that may be implemented as part of the processor 10, and from there to the RS-485 transceivers 30a, 30b and 30c for output on respective two wire twisted pairs N1+/N1−, N2+/N2−, and N3+/N3−.

In this FIG. 3 arrangement, when the RS-485 protocol is being used, the Ethernet portion of the circuitry can be switched off by the processor 10, to reduce electromagnetic interference and power dissipation. Likewise, when the Ethernet protocol is being used, the RS-485 portion of the circuitry may be powered off.

In FIG. 3, if the processor 10 detects that Ethernet packets are being transmitted on the bus, then it will route those packets to the Ethernet Switch 50, which will in turn output those packets through respective PHYs 60a, 60b, and 60c to respective pairs of lines N1+,N1−, N2+, N2−, and N3+, N3−.

Note that in the FIG. 3 embodiment, the processor 10 includes the functionality of UART 20 and MAC/NIC 40 that are shown as external components to the processor 10 in the FIGS. 1 and 2 embodiments.

In accordance with the FIG. 3 embodiment, the exemplary three port configuration requires only 6 connector pins (two for each port) rather than the 12 connector pins required by the FIG. 2 embodiment. Further, while FIG. 3 shows the use of respective capacitors 62 at the output of the PHYs 60a, 60b, and 60c to provide isolation on the Ethernet side, magnetic or optical coupling can be used as well, although capacitive coupling may be preferred because capacitive coupling is not subject to magnetic field saturation effects and is less expensive than optical coupling.

Figure 4:
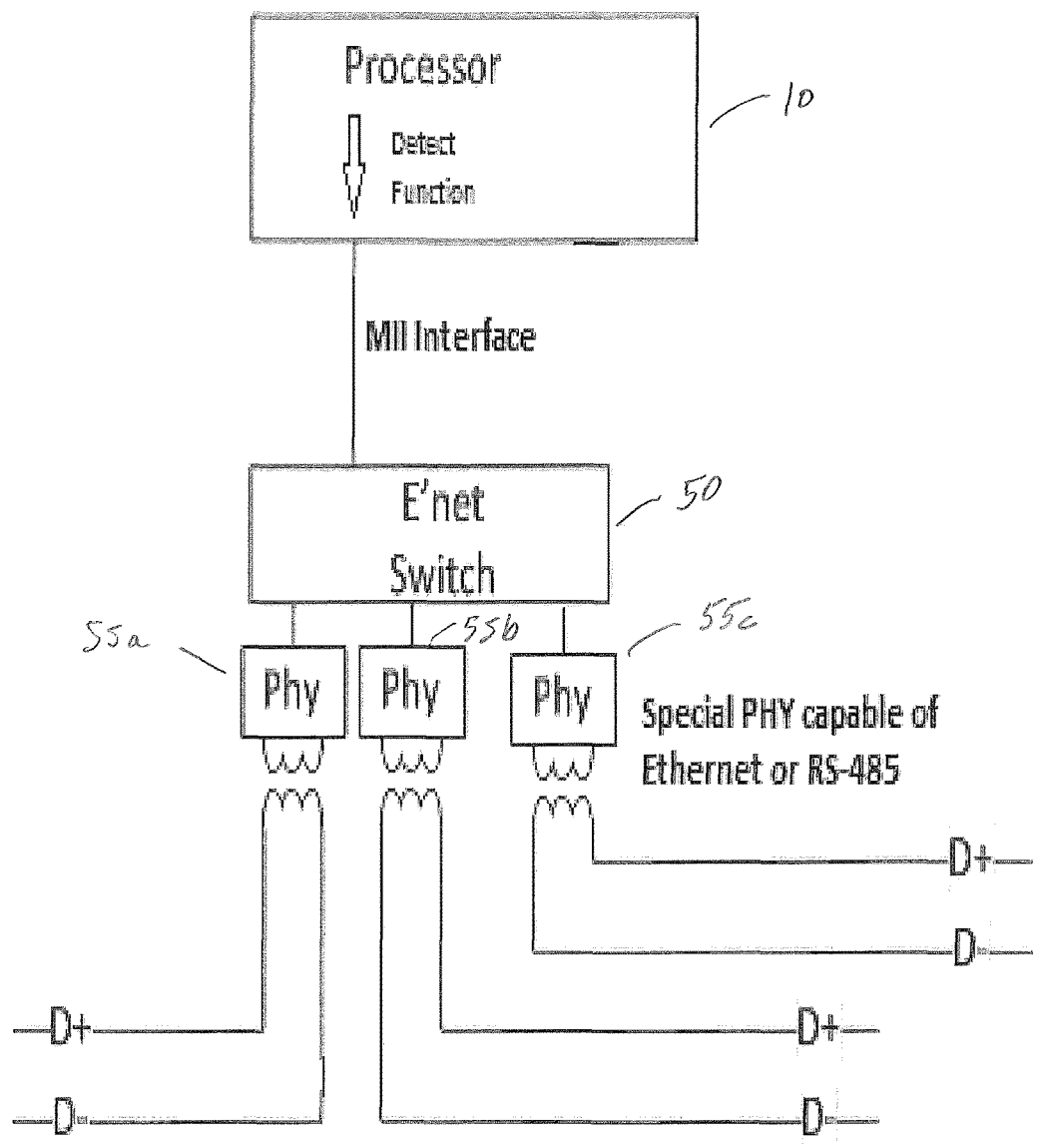
FIG. 4 is a block diagram showing a circuit configuration that may be used to automatically select either an RS-485 or 802bw communications protocol under processor control, in a three port configuration that uses six output pins.

FIG. 4 shows yet a further three port embodiment which reduces components by using custom physical layer circuits (PHYs 55a, 55b, and 55c) that include RS-485 transceivers, and are therefore capable of transmitting and receiving both 802bw Ethernet and RS-485 signals. As in the FIG. 3 embodiment, upon turn on of the processor 10 in FIG. 4, the processor 10 monitors the bus for the presence of Ethernet packets. If the processor does not detect any Ethernet packets, that it sends a command to the Ethernet switch 50 and PHYs 55a, 55b, and 55c that RS-485 mode is to be used. In the RS-485 mode, the Ethernet switch 50 then retransmits the serial data to emulate a multi-drop RS-485 network. Note that the FIG. 4 implementation not only has a low connector pin count (2 connector pins per port) but also the lowest number of components.

In other embodiments that fall within the scope of this disclosure, the automatic detection of the communications protocol being used may be implemented by, in accordance with the teachings herein, in a custom physical layer circuit PHY or a custom Ethernet switch that incorporates such automatic detection capability. For example, custom ICs capable of monitoring the width of the data pulses being transmitted can be incorporated into a custom PHY or custom Ethernet switch. If the pulse widths are monitored to be greater than the range defined by the 802bw protocol, the Ethernet switch or PHY would be set to operate in RS-485 mode and would convert the RS-485 data stream into RS-485 commands for retransmission.

Figure 7:
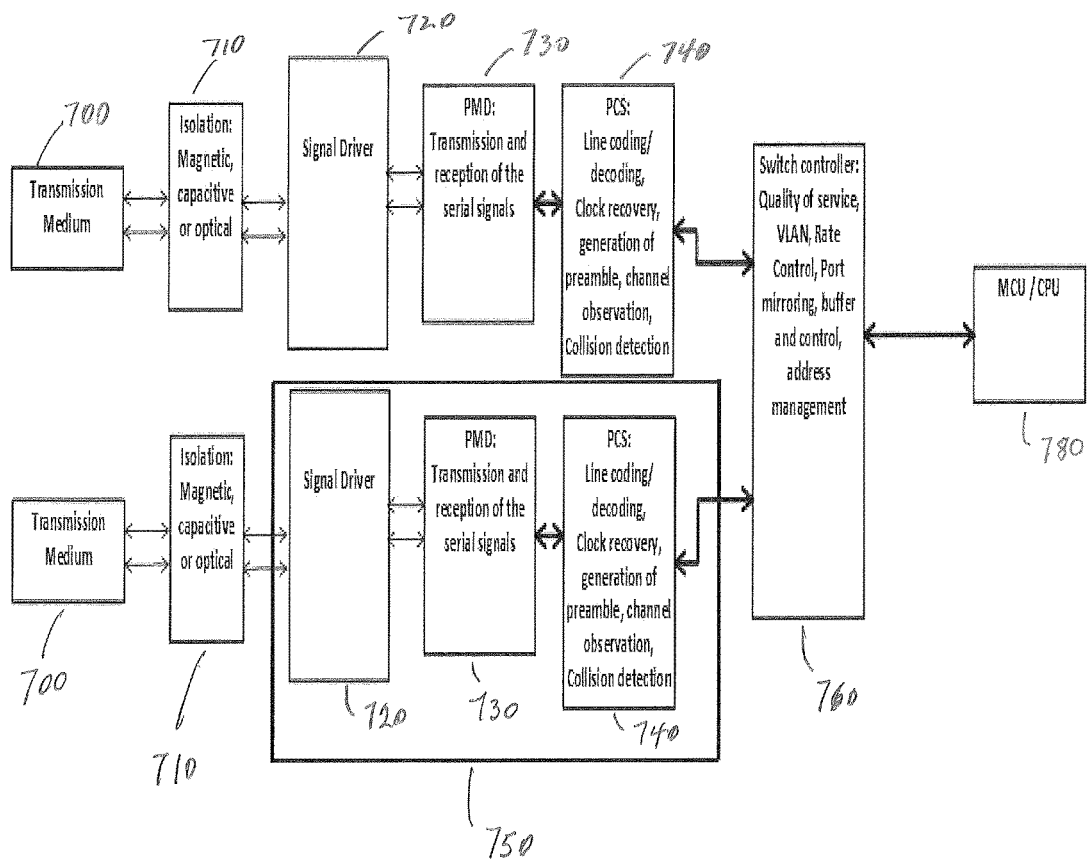
FIG. 7 is a generic block diagram of a two port ethernet controller.

In particular, such embodiments can be further understood and further explained with reference to FIG. 7, which provides a generic block diagram of a two port Ethernet controller. With reference to FIG. 7, while the physical transmission medium 700 may in general be either a fiber-optic cable or wire, for the purposes of the embodiments disclosed herein, the transmission medium 700 may be understood to be a two wire twisted pair that carries either the RS-485 signals or the 802bw signals.

An isolation block 710 is provided between the transmission medium 700 and the rest of the FIG. 7 circuit blocks to insure that signal driver circuit 720 does not undesirably load the signals being processed. Signal driver circuit 720 is typically implemented as a push/pull MOSFET circuit that impresses the signal onto the transmission medium 700 and processes signals received from the transmission medium 700.

The Physical Medium Dependent (PMD) sublayer 730 shown in FIG. 7 provides for transmission and reception of the serial signals. This circuit is typically implemented by a combination of analog-to-digital and digital-to-analog circuits.

The Physical Coding Sublayer (PCS) 740 includes circuitry that monitors the signals being transmitted/received to perform clock recovery, generation of the preamble, collision detection and avoidance. THE PCS 740 also includes circuitry that monitors and provides beginning and end of frames, as well as other functions.

As shown in FIG. 7, the signal driver 720, and the PMD 730 and PCS 740 sublayers are typically referred to as comprising the Physical Layer or PHY 750.

With further reference to FIG. 7, the Ethernet switch 760 is a controller interface between the PHY 750 and the processor 780. As shown, the Ethernet switch 760 typically processes data on multiple ports (two shown in FIG. 7 for illustration purposes). Ethernet switch 760 directs the outgoing and incoming data to the appropriate output port or to an internal port of processor 780. Ethernet switch 760 typically communicates with the processor's internal port via an MII interface.

In order to implement automatic detection of the RS-485 or 802bw protocol, changes may be made to the generic block diagram of FIG. 7 in accordance with the following design criteria, the implementation of which is readily within the capabilities of persons of ordinary skill in this art.

First, the isolation section 710 should be designed to accommodate the particular specification and signal characteristics of each of the RS-485 and 802bw protocols that may be on the medium. For example, termination impedance is important to signal integrity. In particular, RS-485 is a much slower bus that the 100 BaseT1 802bw protocol. The isolation section 710 must therefore be designed to not saturate and cause a loss of signals, regardless of the protocol on the bus.

The voltage rating of the isolation section 710 should be designed to meet the highest voltage that it may need to handle when accommodating either the RS-485 and 802bw protocols. For example, the RS-485 protocol may result in differential signals as high as 12V, requiring the voltage rating of the components in isolation section 710 to be higher.

The signal driver 720 should be designed with similar considerations as isolation section 710. For example, the signal driver 720 should be implemented using components having voltage ratings that are higher than the voltages found in the RS 485 and 802bw protocols; and the signal driver 720 circuitry should be chosen to cooperate with the components in the isolation section 710.

In embodiments where a customized PHY layer is used to determine the protocol on the bus, the PHY layer may be designed to determine the protocol by monitoring the different characteristics of the 802bw and RS-485 signals. For example, a 100 Base-T1 802bw Ethernet signal includes a 64 bit synchronizing prefix that is sent at a rate of 100 Mbits/sec. On the other hand, an RS-485 signal has a prefix that is a low signal level for approximately 1 ms. A PHY or Ethernet switch may be customized to automatically detect which protocol is on the bus by detecting the different parameters of the prefixes present on the bus to automatically detect whether the bus is carrying RS-485 or 802bw signals. Alternatively, a PHY or Ethernet switch may be customized, as noted above, to detect the specific protocol being used by monitoring the difference in detected pulse widths, which are different for these protocols. Once the protocol is automatically detected in this manner, the signals may be routed to the appropriate decoder circuitry.

Figure 5:
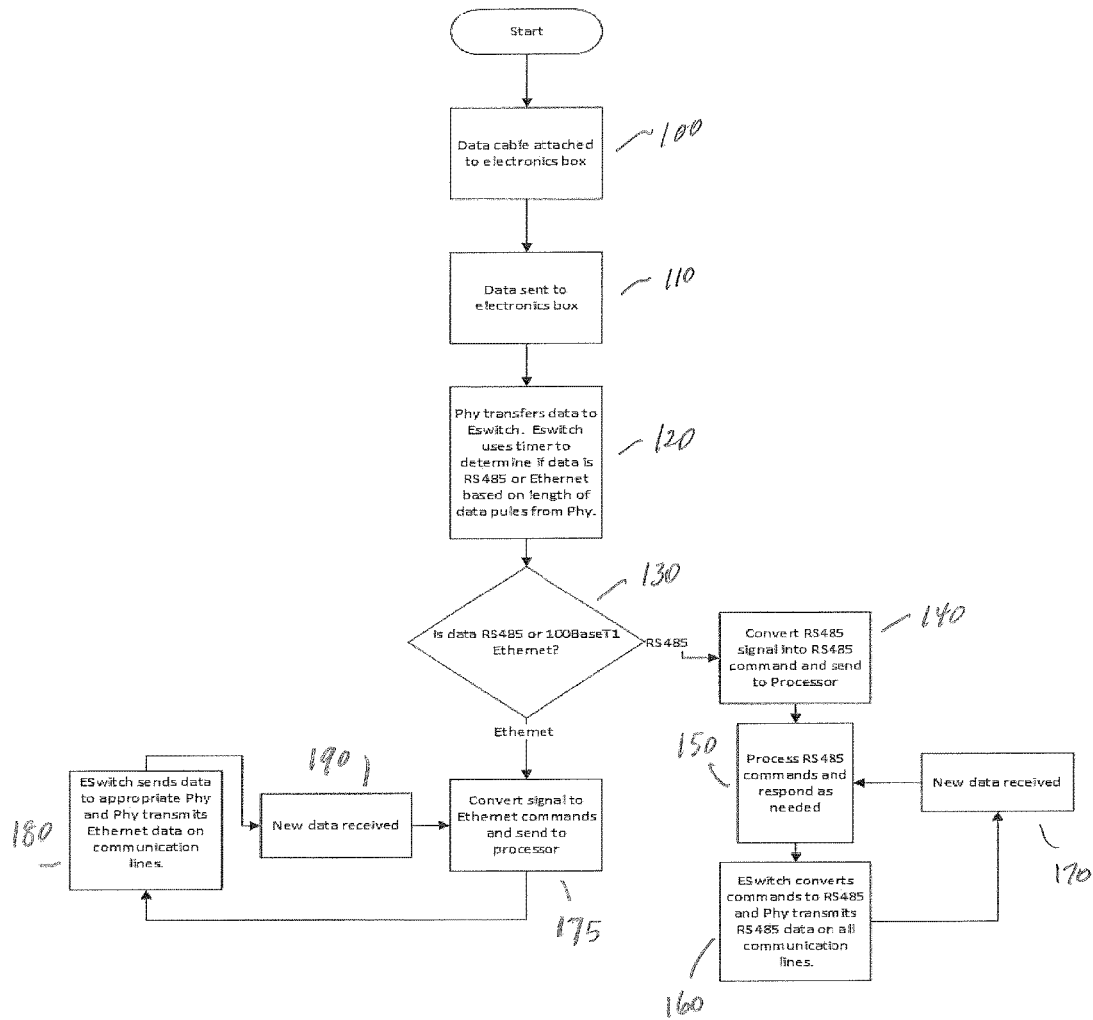
FIG. 5 provides a flow chart showing the steps by which automatic detection of a communications bus protocol can be implemented in an Ethernet switch to automatically select either an RS-485 or 802bw communications protocol.

An exemplary flow chart showing the sequence of steps for automatically detecting the communication bus protocol in a custom Ethernet switch is shown in FIG. 5. This sequence of steps starts with the attachment of a data cable to the electronics box in step 100, on which data is sent to the electronics box in step 110. Upon receipt of this data, the PHY transfers the data to the Ethernet switch in step 120.

In accordance with the foregoing discussion, the Ethernet switch may include a timer circuit configured to measure the length of the data pulses being received in step 120, and based upon that measurement it is determined in step 130 whether the received data is being transmitted in accordance with the longer data pulse (low speed) RS-485 protocol or the shorter data pulse (high speed) 100 Base-T1 802bw Ethernet protocol.

If it is determined that the data being received is in accordance with the RS-485 protocol, the data is converted into appropriate RS-485 commands in step 140 and sent to the processor. In step 150, those RS-485 commands are processed and responses returned as needed. In step 160, the Ethernet switch converts the commands into Ethernet protocol signals for transmission by the PHYs. When new data is received by the PHYs in step 170, the processor processes that data in step 150, and so on.

Comparably, if it is determined in step 130 that the data being sent on the data cable to the electronics box is in the 100 Base T1 format consistent with the 802bw protocol, then that data is converted by the Ethernet switch into Ethernet commands (step 175) that are sent to the processor, which then transmits the Ethernet data through the Ethernet switch and corresponding PHY for output on the appropriate two wire communications lines (step 180). Finally, when new data is received in step 190 by the PHYs, the Ethernet switch converts that data into Ethernet commands that are sent to the processor for response, and so on.

Figure 6:
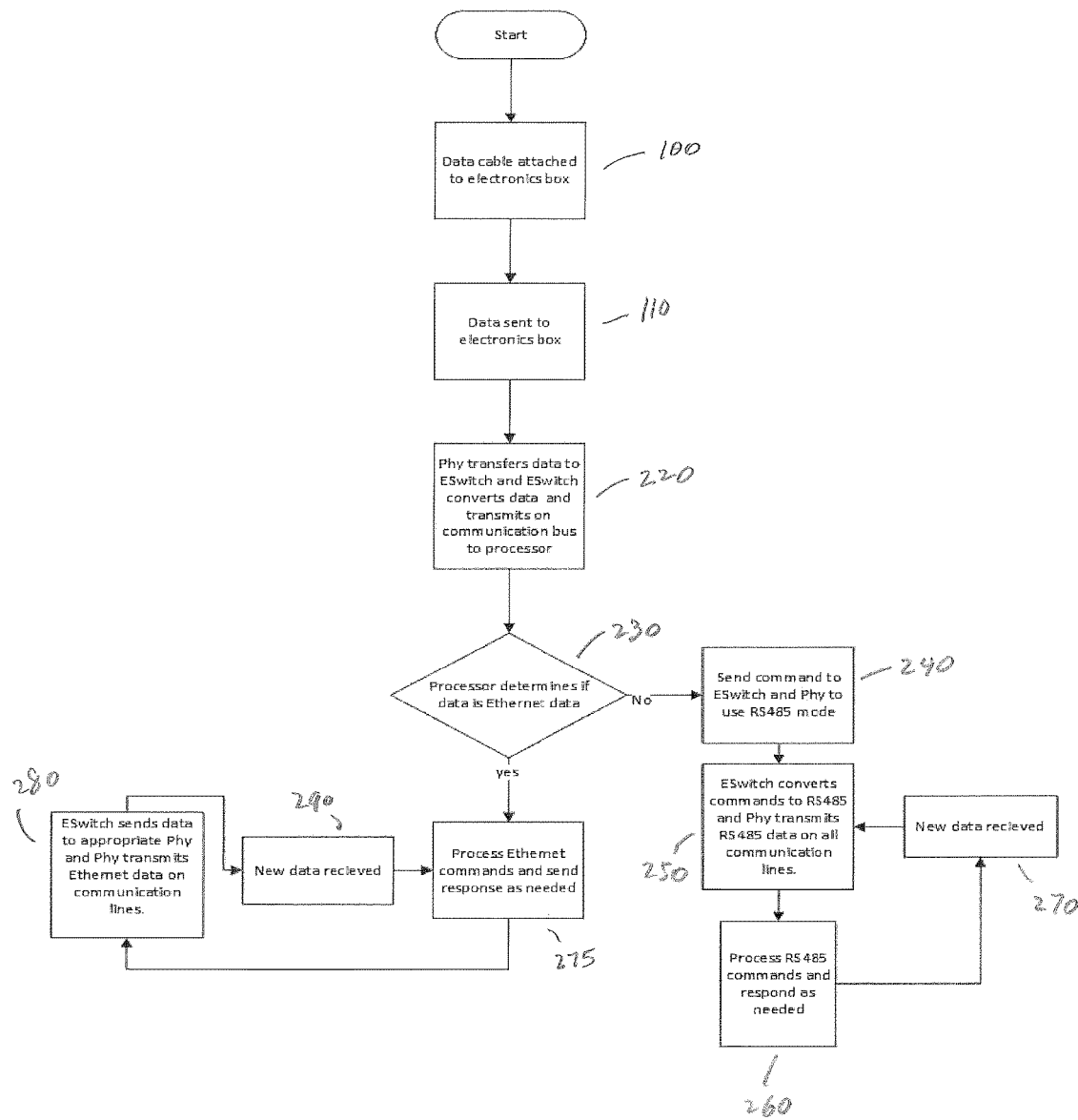
FIG. 6 provides a flow chart showing the steps by which automatic detection of a communications bus protocol can be implemented in a processor to automatically select either an RS-485 or 802bw communications protocol.

FIG. 6 shows a comparable flow chart to FIG. 5, in an exemplary case where automatic detection of the communication bus protocol is performed by the processor (e.g. processor 10 of FIG. 4), rather than by the Ethernet switch.

Referring to FIG. 6, in this exemplary case, after data is sent to the electronics box in step 110, the PHY transfers the data to the Ethernet Switch which packetizes and transfers the packets to the processor (step 220). In step 230 of this embodiment, the processor determines whether the packets contain the characteristic Ethernet preamble or the RS-485 preamble. Alternatively, the processor may determine whether or not the data is Ethernet data or RS-485 data, by for example analyzing the length of the data pulses to distinguish between the longer data pulse RS-485 protocol and the shorter data pulse 100 Base T1 802bw data protocol.

If it is determined in step 230 that the data is not Ethernet data (and therefore is RS-485 data) then, in step 240, the processor sends a command to the Ethernet Switch and PHY to use the RS-485 mode. Upon receipt of that command, the Ethernet switch implements the RS-485 mode in step 250 such that RS-485 data is transmitted on the communication lines in step 260. Likewise, when new RS-485 data is received in step 270, the PHY and Ethernet switch transmit that data to the processor and it is processed accordingly.

Comparably, if it is determined in step 230 that the data is Ethernet data, then the Ethernet commands are processed in step 275 and the Ethernet switch then sends the data to the appropriate PHY for transmission of the data on the communication lines (step 280). When new Ethernet data is received (step 290), that data is processed in step 275, and so on.

Although the disclosed subject matter has been described and illustrated with respect to the exemplary embodiments provided herein, it will be understood by those of ordinary skill in the art that various additions and modifications may be made to these disclosed embodiments without departing from the spirit and scope of the innovations disclosed herein, which are set forth in the following claims.

What is claimed is:

1. An interface circuit for selecting and processing signals corresponding to one of a plurality of communications protocols provided on one or more communications ports, comprising:
    a processor;
    an Ethernet switch in electronic communication with the processor;
    a plurality of physical layer circuits, each in electronic communication with the Ethernet switch and each including a RS-485 transceiver and capable of transmitting and receiving each of 802.3bw Ethernet signals and RS-485 signals;
    wherein each physical layer circuit has two associated pins;
    wherein the processor is configured to
        determine on each of the physical layer circuits that an incoming communication is one of a 802.3bw Ethernet communication and an RS-485 communication by detecting at last one of 1. that the width of at least one data pulse of the incoming communication is greater than the range defined by the 802.3bw protocol, and 2. that an RS-485 or 802.3bw preamble is present in the incoming communication,
        and the processor is further configured to, when the incoming communication is an RS-485 communication, send a command to the Ethernet switch and the physical layer circuit receiving the RS-485 communication that a RS-485 mode is to be employed, wherein in RS-485 mode the Ethernet switch retransmits serial data or, when the incoming communication is an 802.3bw Ethernet communication, send a command to the 802.3bw Ethernet switch and the physical layer circuit receiving the Ethernet communication that a 802.3bw Ethernet mode is to be employed.

2. An interface circuit for selecting and processing signals on one or more ports corresponding to either an RS-485 or 802.3bw Ethernet protocol, comprising:
    a processor,
    at least one port;
    each port having associated with and in communication with RS-485 signal processing circuitry and 802.3bw Ethernet signal processing circuitry;
    wherein the RS-485 signal processing circuitry and 802.3bw Ethernet signal processing circuitry includes one or more physical layer circuits (PHYs), each PHY connected to one of the at least one ports, and having an RS-485 transceiver;
    wherein the processor is configured to:
        determine whether the ports are receiving RS-485 signals or 802.3bw Ethernet signals by detecting at least one of 1. that the width of at least one data pulses of a communication is greater than the range defined by the 802.3bw protocol, and 2. that an RS-485 or 802.3bw preamble is present in the communication,
        and to process communications with the ports according to which of RS-485 signals or 802.3bw Ethernet is being received.

3. The interface circuit of claim 2 further comprising an Ethernet switch coupled between the processor and the one or more PHYs.

4. The interface circuit of claim 3 further comprising a media access controller/network interface controller (MAC/NIC) coupled between the Ethernet switch and the processor.

5. An interface circuit for selecting and processing signals corresponding to either an RS-485 or 802.3bw Ethernet protocol, comprising:
    at least one port, each port configured to receive both RS-485 communications and 802.3bw Ethernet communications;
    a processor;
    RS-485 signal processing circuitry coupled to the processor;
    802.3bw Ethernet signal processing circuitry coupled to the processor; and
    wherein the processor detects if signals input on each port correspond to the RS-485 protocol or the 802.3bw Ethernet protocol by detecting at least one of 1. that the width of at least one data pulse of the signals input on each port is greater than the range defined by the 802.3bw protocol, and 2. that an RS-485 or 802.3bw preamble is present in the signals input on each port, and route the signals between each port and one of the RS-485 or 802.3bw Ethernet signal processing circuitry to match the protocol of the signals to their appropriate signal processing circuitry.

6. The interface circuit of claim 5, wherein the output of the RS-485 or 802.3bw Ethernet processing circuitry is provided from each port to a shared two wire bus.

7. The interface circuit of claim 5, wherein the RS-485 signal processing circuitry or 802.3bw Ethernet processing circuitry to which signals are not routed by the processor is turned off to reduce power consumption.

8. An interface circuit for selecting and processing signals corresponding to either an RS-485 or 802.3bw Ethernet protocol on one or more ports, comprising:
- at least one port configured to receive both RS-485 communications and 802.3bw Ethernet communications;
- a processor;
- a switch coupled to the processor, the switch including circuitry for detecting if signals received thereby from each port comply with RS-485 protocol or 802.3bw Ethernet protocol by detecting at least one of 1. that the width of at least one data pulse of the signals input on each port is greater than the range defined by the 802.3bw protocol, and 2. that an RS-485 or 802.3bw preamble is present in the signals input on each port; and
- a physical layer circuit coupled between the switch and each port configured to process signals provided in either RS-485 or 802.3bw protocol as detected by the switch.

9. The interface circuit of claim 8, wherein the signals after processing are output from each port on a shared two wire bus.

\* \* \* \* \*